(12) United States Patent  
Kalhan

(10) Patent No.: US 8,995,308 B2  
(45) Date of Patent: Mar. 31, 2015

(54) CONTROL CHANNEL ARCHITECTURE WITH CONTROL INFORMATION DISTRIBUTED OVER MULTIPLE SUBFRAMES

(75) Inventor: Amit Kalhan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 90 days.

(21) Appl. No.: 13/703,876

(22) PCT Filed: Jun. 18, 2010

(86) PCT No.: PCT/US2010/039185  
§ 371 (c)(1),  
(2), (4) Date: Dec. 12, 2012

(87) PCT Pub. No.: WO2011/159313  
PCT Pub. Date: Dec. 22, 2011

(65) Prior Publication Data  
US 2013/0083770 A1  Apr. 4, 2013

(51) Int. Cl.  
*H04B 7/005* (2006.01)  
*H04W 72/04* (2009.01)  
*H04L 5/00* (2006.01)

(52) U.S. Cl.  
CPC ........... *H04W 72/042* (2013.01); *H04L 5/0053* (2013.01); *H04L 5/0007* (2013.01)  
USPC .......................................... 370/270; 370/330

(58) Field of Classification Search  
USPC ................................................ 370/330, 270  
See application file for complete search history.

(56) References Cited

U.S. PATENT DOCUMENTS

| 2007/0076587 | A1 | 4/2007 | Kwon et al. | |
| 2009/0316626 | A1* | 12/2009 | Lee et al. | 370/328 |
| 2010/0165931 | A1* | 7/2010 | Nimbalker et al. | 370/329 |
| 2011/0164585 | A1 | 7/2011 | Yu et al. | |
| 2012/0002635 | A1* | 1/2012 | Chung et al. | 370/329 |

FOREIGN PATENT DOCUMENTS

| EP | 2 139 255 A1 | 12/2009 |
| KR | 10-2010-0014179 | 2/2010 |
| WO | WO 2010-013960 A2 | 2/2010 |

OTHER PUBLICATIONS

Office Action dated Oct. 8, 2013, issued for Japanese Application No. 2013-515315.  
Office Action dated Oct. 22, 2013, issued for Japanese Application No. 2013-515313.

(Continued)

*Primary Examiner* — Sai-Ming Chan

(57) ABSTRACT

Control information (126) related to the reception of data (128) within a subframe (116) is transmitted over multiple subframes (114, 116) by a base station (102). A controller (134) in a mobile wireless communication device (104) reconstructs the control information (126) received over multiple subframes (114, 116) based on at least some control information (130) in a first physical control channel (118) in a first sub-frame (114) and at least some other control information (132) in a second physical control channel (120) in a second subframe (116).

14 Claims, 4 Drawing Sheets

(56) References Cited

OTHER PUBLICATIONS

S. Syed Ameer Abbas, Geethu K. S, S. J. Thiruvengadam, "Realization of Physical Downlink Control Channel (PDCCH) for LTE under SISO Environment using PlanAhead Tool and Virtex 5 FPGA", International Journal of Emerging Technology and Advanced Engineering (www.ijetae.com), Apr. 2012, pp. 173-182, vol. 2, Issue 4.

Non-Final Office Action dated Apr. 11, 2014 issued by Korean Patent Office for Korean Patent Application No. 10-2013-7001112.

* cited by examiner

CONTROL CHANNEL ARCHITECTURE WITH CONTROL INFORMATION DISTRIBUTED OVER MULTIPLE SUBFRAMES

RELATED APPLICATIONS

The application is related to International Patent Application Serial Number PCT/US2010/039175 entitled "CONTROL CHANNEL ARCHITECTURE WITH CONTROL INFORMATION DISTRIBUTED OVER MULTIPLE SUBFRAMES ON DIFFERENT CARRIERS", filed concurrently with this application, and incorporated by reference in its entirety herein.

BACKGROUND

The invention relates in general to wireless communication systems and more specifically to control signals in a wireless communication system.

Base stations in cellular communication systems provide communications services to wireless communication devices within geographical cells where each base station exchanges signals with wireless communication devices within an associated cell. The size and shape of each cell and, therefore, the coverage area of the base station are determined by several factors and are at least partially based on design parameters of the base station. In addition to large macro cells that provide services to numerous devices within relatively large geographical areas, some cellular communication systems are increasingly employing smaller cells to increase efficiency, improve coverage, improve the quality of service, and provide additional services. The smaller cells may include a variety of sizes typically referred to as microcells, picocells and femtocells. Microcells and picocells are often implemented within office buildings, shopping centers and urban areas in order to provide additional security, higher user capacity for the area, additional service features, and/or improved quality of service. Femtocells have relatively smaller geographical areas and are typically implemented at residences or small office locations. Since typical cellular backhaul resources may not be available in these locations, femtocells are sometimes connected to the cellular infrastructure through DSL or cable modems. Femtocells are part of the cellular network and, therefore, communicate with the wireless devices using the same techniques as those used by macrocells. In addition to data information, control signals are exchanged between the base stations and mobile communication devices. In some circumstances, control information is transmitted within a downlink control channel from a base station to a mobile communication where the control information indicates how data communication can be received such as information on demodulation, decoding, etc. Communication resources may be divided into frames including subframes. In conventional systems, control information regarding the reception of data in a subframe is transmitted in the same subframe as the data.

SUMMARY

Control information related to the reception of data within a subframe is transmitted over multiple subframes by a base station. A controller in a mobile wireless communication device reconstructs the control information received over multiple subframes based on at least some control information in a first physical control channel in a first subframe and at least some other control information in a second physical control channel in a second subframe.

DETAILED DESCRIPTION

Figure 1:
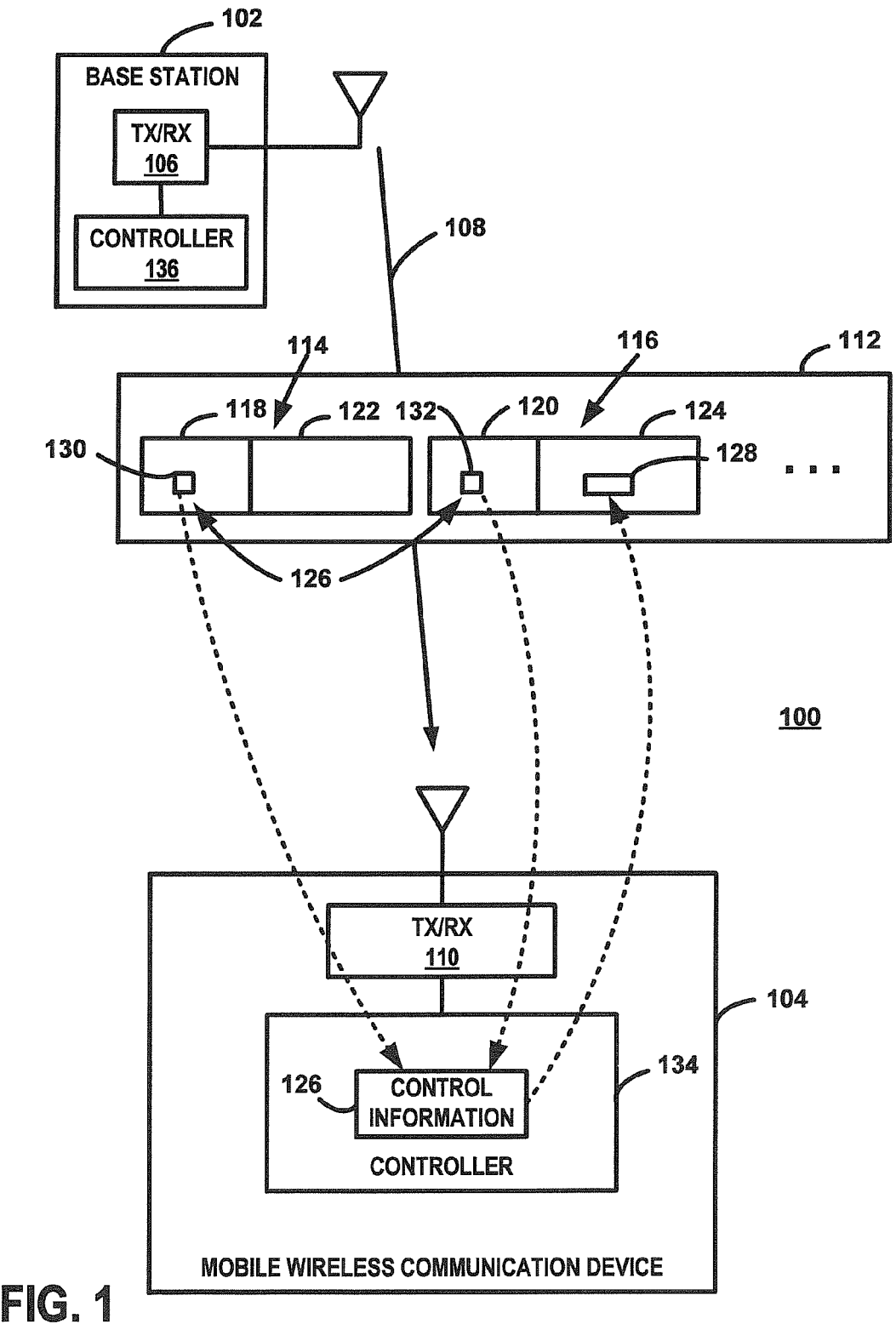
FIG. 1 is a block diagram of a communication system in accordance with an exemplary embodiment of the invention.

FIG. 1 is a block diagram of a communication system 100 in accordance with an exemplary embodiment of the invention. The communication system 100 may be implemented in accordance with any of numerous technologies and communication standards. For the examples discussed below, the system 100 operates in accordance with an orthogonal frequency division multiplex (OFDM) standard. The various functions and operations of the blocks described with reference to the communication system 100 may be implemented in any number of devices, circuits, and/or elements as well as with various forms of executable code such as software and firmware. Further, the reference to "first" and "second" components is made for identification purposes and does not necessarily indicate any relative timing information. For example, a second signal may be transmitted before, after, or at the same time as a first signal.

The system 100 includes at least one base station 102 and at least one wireless communication device 104. In most circumstances, several base stations are connected to a network controller through network infrastructure to provide wireless communication services to multiple wireless communication devices. The base station 102 includes a wireless transceiver 106 that exchanges wireless signals 108 with a wireless transceiver 110 in the wireless communication device 104. Accordingly, the base station 102 includes a transmitter for transmitting wireless signals to the wireless communication device 104 which includes a receiver for receiving the signals. Transmissions from the base station 102 and from the wireless communication device 104 are governed by a communication specification that defines communication signaling, protocols; and parameters of the transmission. The communication specification may provide strict specifications for communication and may also provide general requirements where specific implementations may vary while still adhering to the communication specification. Although the discussion below is directed to the 3GPP Long Term Evolution (LTE) communication specification, other communication specifications may be used in some circumstances. The communication specification defines at least a data channel and a control channel for uplink and downlink transmissions and specifies at least some timing and frequency parameters for a physical downlink control channel from base stations to wireless communication devices. The control channel includes a broadcast control channel as well as control channels scheduled to specific wireless communication devices. In an OFDM based system, a physical channel can be defined by allocating specific frequency-time resources. The granularity of these resources depends on the specification and design of the system. As discussed in further detail below, the transmission of frequency-time resources, sometimes referred to as resource elements, is defined within frames 112 that include several subframes 114, 116. Each subframe 114, 116 includes a physical control channel 118, 120 and a physical data channel 122, 124. Although a particular implementation may further specify frequency, timing, and coding parameters for each base station and/or wireless communication device, conventional systems transmit control information and the related data for a wireless communication device 104 only within the same subframe.

In the examples discussed herein, however, the control information 126 related to data 128 in a subframe 116 is distributed over at least one other subframe 114. In one example, at least a first portion 130 of the control information is transmitted over a first physical control channel 132 of a first subframe 114 and at least a second portion 132 of the control information 126 is transmitted over a second physical control channel 120 of a second subframe 116, where the control information 126 facilitates reception of data 128 in the physical data channel 124 of the second subframe 116. The transceiver 110 in the wireless communication device 104 receives the subframes 112, 114 and a controller 134 reconstructs the control information 126 from at least some of the control information 130 in the first subframe and at least some of the control information 132 in the second subframe 116. The control information 126 is used by the receiver of the transceiver 110 to receive the data 128 in the physical data channel 124 in the second subframe 116. Although the example discusses only two subframes, the technique may also be applied to more than two subframes. In some circumstances, the control information 126 is transmitted over the physical control channels of one or more subframes other than the subframe 116 including the data 128 to which the control information 126 corresponds.

As discussed herein, therefore, control information 126 is the complete control information required to be received by the wireless communication device 104 in order to receive the data 128 to which the control information 126 corresponds. Before transmission, the control information 126 may be coded, or otherwise processed, to reduce errors. Consequently, some redundancy of information may occur between subframes and/or within a subframe. In some circumstances, the wireless communication device 104 may be capable of only accurately receiving some of the control information transmitted within each subframe but is capable of reconstructing all of the control information 126 required to receive the data 128. The control information 126 may also be scrambled before or after being separated into the multiple portions.

Therefore, a controller 136 in the base station 102 separates the control information 126 into a first portion 130 and a second portion 130 and assigns the portions to two or more subframes. The separation is typically performed as a mapping of error coded control information across the subframes after the control information is error coded. The mapping results in the first portion of the control information 130 mapped to the first physical control channel 118 of the first subframe 114 and the second portion of the control information 132 mapped to the second physical control channel 120 of the second subframe 116. The second subframe 116 also includes the data 128 within the data channel 124. The frame 112 having the control information distributed over the subframes 114, 116 is transmitted to the wireless communication device 104. Based on at least some of the received information of the two or more portions of control information 130, 132, the controller 134 in the wireless communication device 104 reconstructs the control information 126. The received and decoded control information is used to receive the data 128.

As discussed herein, the control information 126 is information or data related to communication between the base station 102 and the wireless communication device 104. The control information 126 is transmitted within control channels. Accordingly, although a control channel may be defined across multiple subframes in conventional systems, the examples herein discuss transmitting information over multiple subframes using either multiple control channels or a single control channel defined over multiple subframes.

Figure 2:
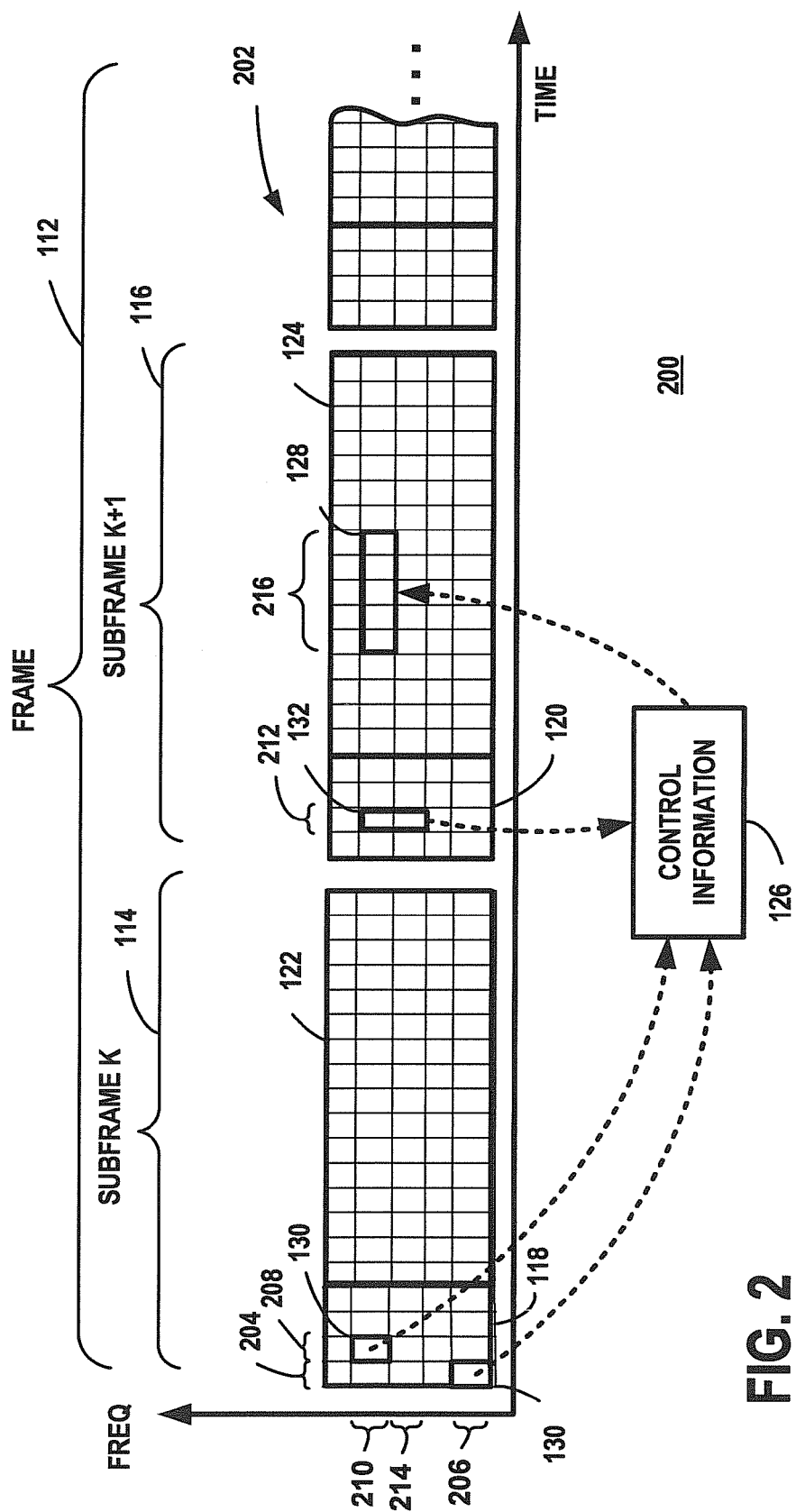
FIG. 2 is a graphical illustration of a frame with a plurality of resource elements.

FIG. 2 is a block diagram of the frame 112 in a frequency-time graph 200 showing frequency-time resource elements 202. The graph 200 in not necessarily drawn to scale and only provides an exemplary visual representation. Numerous other combinations of resource elements may be used to transmit the control information 126 and the data 132.

The frame 112 includes a plurality of subframes including at least a first subframe (K) 114 and a second subframe (K+1) 116. The frequency carrier used for transmission is divided into a plurality of subcarriers. Transmission is also divided in time to define a plurality of times slots where the time slots are further divided into symbol times. For LTE communication specifications, each time slot includes seven symbol times. The combination of symbol times and subcarriers defines resource elements 202. Accordingly, a symbol transmitted over a subcarrier is a resource element. Each portion of control information 130, 132 transmitted in a subframe is transmitted using one or more resource elements. The resource elements used for transmission of related information may or may not be contiguous. For the example of FIG. 2, the first portion of control information 130 is transmitted using first symbols 204 over a first subcarrier 206 and second symbols 208 over a second subcarrier 210 in the first subframe 114. The second portion of the control information 132 is transmitted using third symbols 212 over the second subcarrier 210 and a third subcarrier 214 in the second subframe 116. The data 128 is transmitted using fourth symbols 216 over the second subcarrier 210 in the second subframe 116. As explained above, at least some of the control information in the first portion 130 and at least some of the control information of the second portion 132 are required to reconstruct the control information 126. For example, the controller 134 in the wireless communication device 104 may be able to reconstruct the control information 126 from successful reception of only the information transmitted in the second subcarrier and third subcarrier. For such a situation, corruption of the first symbols 204 transmitted over the first subcarrier 206 would not hinder the wireless communication device from receiving the control information 126 and consequently accurately receiving the data 132.

Figure 3:
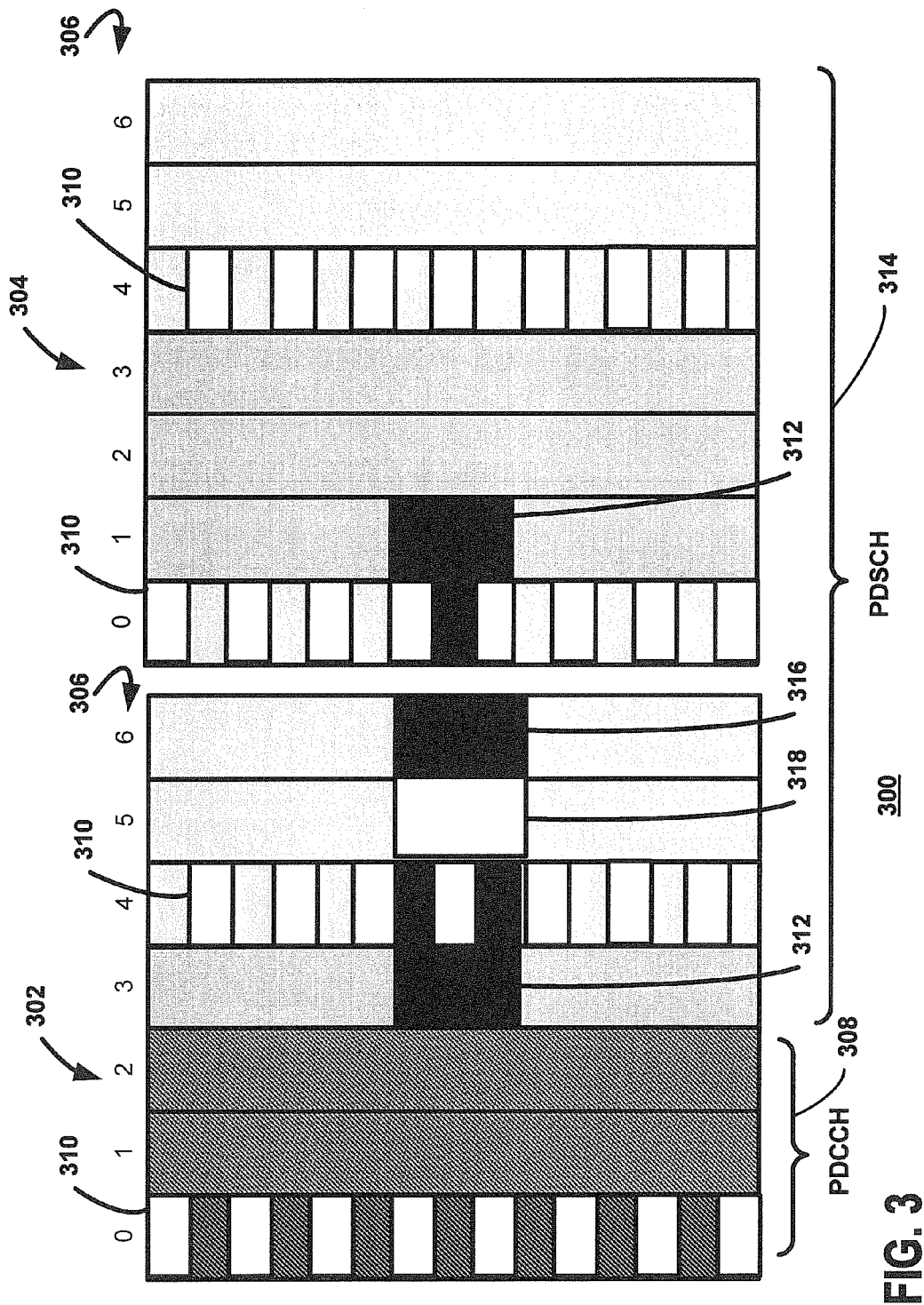
FIG. 3 is an illustration of a sub-frame in accordance with a 3GPP Long Term Evolution (LTE) communication specification.

FIG. 3 is an illustration of a subframe 300 in accordance with a 3GPP LTE communication specification. The subframe 300 includes two slots 302, 304, where each slot includes seven symbol times 306. The symbol times 0, 1 and 2 in the first slot 302 form the physical control channel 118, 120 which is a Physical Downlink Control Channel (PDCCH) 308. Pilot signals (or Reference Signals) 310 are injected at symbol times 0 and 4. The subframe 300 includes a broadcast channel that is a Physical Broadcast Channel (PBCH) 312 and spans portions of symbol times 3 and 4 of the first slot 302 and portions of symbol times 0 and 1 of the second slot 304. The data channel 122, 124 is a Physical Downlink Shared Channel (PDSCH) 314 and is covered by the remainder of symbol times 3-6 of the first slot 302 and symbol times 1-6 of the second slot 304. The sub-frame 300 also includes a primary synchronization channel (P-SCH) 316 and a secondary synchronization channel (S-SCH) 318.

In an example where the control information 126 is transmitted in accordance with the 3GPP LTE communication specification, therefore, a first portion of the control information 130 is transmitted within symbol time 1 and/or symbol time 2 within the first and second subframes. As described above, the resource elements may be contiguous or noncontiguous within a subframe. The data 128 transmitted in the second subframe is transmitted over symbol times 3, 4, 5, and/or 6 of the first slot 302 and/or symbol times 1,2, 3, 5, and/or 6 of the second slot 304.

Figure 4:
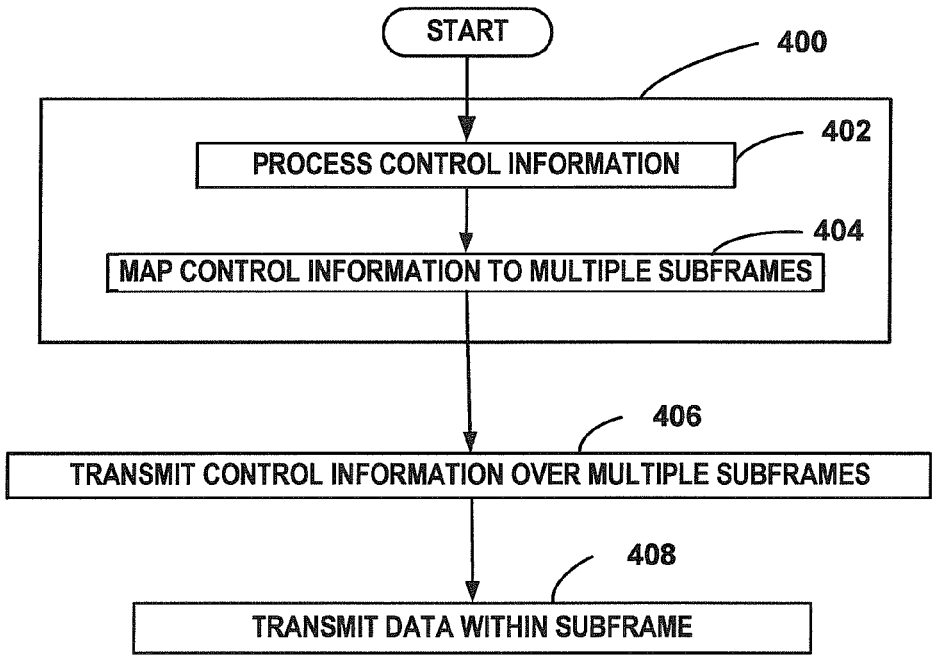
FIG. 4 is a flow chart of a method performed at a base station.

FIG. 4 is a flow chart of a method performed at the base station 102. Although the method may be performed using any combination of code and/or hardware, the method is facilitated by executing code on the controller 136 within the base station 102 in the exemplary embodiment.

At step 400, the control information is separated into portions and assigned to a plurality of subframes. The separation may include processing, scrambling, coding and mapping in accordance with known techniques of downlink physical channel processing. For the example of FIG. 4, step 400 includes processing the control information at step 402 and mapping the control information to multiple subframes at step 404. Mapping may include, antenna ports processing (related to MIMO/SDMA), and resource element mapping within Frequency-Time space as well as other processing. The processing and mapping results in error coding of the control information and distribution of the control information 126 over multiple subframes. As discussed above, for example, a first portion 130 is mapped to a first physical control channel 118 of a first subframe 114 and a second portion 132 is mapped to a second physical control channel 120 of a second subframe 116, where the data 128 to which the control information 126 corresponds is within a physical data channel 124 of the second subframe 116. The processing may also include scrambling of the control information 126 before and/or after the control information 126 is divided into portions.

At step 406, the control information is transmitted over multiple subframes. Based on the mapping and processing, a downlink OFDM signal 108 is generated and transmitted from the base station to the wireless communication device 104. As discussed above, the signal 108 includes a frame 112 having a plurality of time-frequency resource elements arranged in a plurality of subframes. The subframes include at least the first subframe and the second subframe.

At step 408, the data 128 is transmitted within the second subframe 116. Since the second portion 132 and the data 128 are transmitted within the same subframe, step 406 and step 408 are performed simultaneously.

Figure 5:
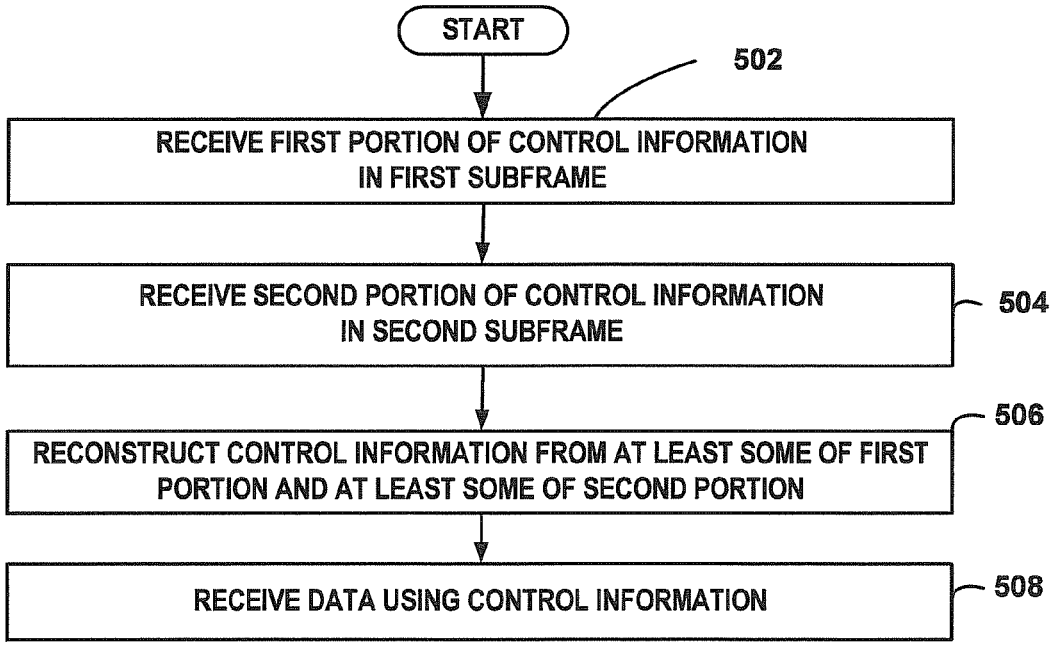
FIG. 5 is a flow chart of a method performed at a mobile wireless communication device.

FIG. 5 is a flow chart of a method performed at the wireless communication device 104. Although the method may be performed using any combination of code and/or hardware, the method is facilitated by executing code on the controller 134 within the wireless communication device 104 in the exemplary embodiment.

At step 502, the first portion of the control information 130 is received within the first subframe 114. The receiver within the wireless communication device 104 receives the OFDM signal 108 over a wireless channel where the signal includes the frame 112 including the first subframe 114.

At step 504, the second portion of the control information 132 is received within the second subframe 116. The receiver receives the second subframe within the frame transmitted in the OFDM signal. The signal is demodulated, decoded and otherwise processed, to receive the first and second portions 130, 132 of the control information 126

At step 506, the control information 126 is reconstructed from at least some of the first portion 130 and at least some of the second portion 132. The portions may require additional processing in some circumstances in order to reconstruct the control information. Where the control information has been error coded or scrambled across the subframes, descrambling and error decoding is applied to the received portions to retrieve the control information. As discussed above, in some circumstances, the control information 126 is retrieved with only some of the information of the first portion 130 and some information of the second portion 132. If the control information 126 is scrambled, it is also descrambled by the receiver and/or the controller.

At step 508, the data 128 is received using the control information 126. The receiver and controller 134 apply the control information 126 to accurately decode, demodulate, and otherwise process the data 128 in the second subframe 116.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A mobile wireless communication device comprising:
a receiver configured to receive a frame over a wireless communication channel, the frame comprising a plurality of time-frequency resource elements arranged in a plurality of subframes comprising a first subframe having a first physical control channel and second subframe having a second physical control channel and a physical data channel, where control information corresponding to reception of data within the physical data channel is distributed as at least some control information over the first physical control channel and as at least some other control information over the second physical control channel; and
a controller configured to reconstruct the control information corresponding to reception of data within the physical data channel, based on the at least some control information in the first physical control channel and the at least some other control information in the second physical control channel.

2. The mobile wireless communication device of claim 1, wherein the frame conforms to a 3GPP Long Term Evolution (LTE) communication specification and the physical control channels are Physical Downlink Control Channels (PDCCHs) defined by a 3GPP Long Term Evolution (LTE) communication specification and the physical data channel is a Physical Downlink Shared Channel (PDSCH) defined by the 3GPP Long Term Evolution (LTE) communication specification.

3. The mobile wireless communication device of claim 1, wherein control information is error coded prior to transmission to the mobile wireless communication device and the controller is further configured to decode the error coding.

4. The mobile wireless communication device of claim 1, wherein control information is scrambled prior to transmission to the mobile wireless communication device and the controller is further configured to descramble the control information.

5. The mobile wireless communication device of claim 1, further comprising applying the control information to receive the data.

6. A base station comprising:
a transmitter configured to transmit a frame over a wireless communication channel, the frame comprising a plurality of time-frequency resource elements arranged in a plurality of subframes comprising a first subframe having a first physical control channel and second subframe having a second physical control channel and a physical data channel; and
a controller configured to divide control information into a first portion of control information and a second portion of control information and to map the first portion of the control information to the first physical control channel and the second portion of the control information to the second physical control channel, the control information corresponding to reception of data within the physical data channel by a mobile wireless communication device.

7. The base station of claim 6, wherein the frame conforms to a 3GPP Long Term Evolution (LTE) communication specification and the physical control channels are Physical Downlink Control Channels (PDCCHs) defined by a 3GPP Long Term Evolution (LTE) communication specification and the physical data channel is a Physical Downlink Shared Channel (PDSCH) defined by the 3GPP Long Term Evolution (LTE) communication specification.

8. The base station of claim 6, wherein the controller is further configured to error code the control information to allow reception of the control information with only some of the first portion of control information and only some of the second portion of the control information.

9. The base station of claim 6, wherein the controller is further configured to scramble the control information prior to dividing the control information.

10. A method comprising:
receiving, at mobile wireless communication device, a frame over a wireless communication channel, the frame comprising a plurality of time-frequency resource elements arranged in a plurality of subframes comprising a first subframe having a first physical control channel and second subframe having a second physical control channel and a physical data channel, where control information corresponding to reception of data within the physical data channel is distributed as at least some control information over the first physical control channel and as at least some other control information over the second physical control channel; and
reconstructing the control information corresponding to reception of data within the physical data channel based on the at least some control information in the first physical control channel and the at least some other control information in the second physical control channel.

11. The method of claim 10, further comprising:
dividing, at a base station, the control information into a first portion of control information and a second portion of control information;
mapping the first portion of the control information to the first physical control channel and the second portion of the control information to the second physical control channel;
transmitting the frame over the wireless communication channel from the base station.

12. The method of claim 11, further comprising:
error coding the control information at the base station; and
applying error decoding at the mobile wireless communication device to receive the control information with only some of the first portion of control information and only some of the second portion of the control information.

13. The method of claim 11, further comprising:
scrambling the control information at the base station prior to dividing the control information; and
descrambling control information at the mobile wireless communication device.

14. The method of claim 10, wherein the frame conforms to a 3GPP Long Term Evolution (LTE) communication specification and the physical control channels are Physical Downlink Control Channels (PDCCHs) defined by a 3GPP Long Term Evolution (LTE) communication specification and the physical data channel is a Physical Downlink Shared Channel (PDSCH) defined by the 3GPP Long Term Evolution (LTE) communication specification.

* * * * *